(12) United States Patent
Barlow

(10) Patent No.: US 6,721,989 B1
(45) Date of Patent: Apr. 20, 2004

(54) SLAPPING WINDSHIELD WIPER FOR DE-ICING

(76) Inventor: Robert N. Barlow, 2216 3rd St. SW., Loveland, CO (US) 80537

( * ) Notice: Subject to any disclaimer, the term of this patent is extended or adjusted under 35 U.S.C. 154(b) by 0 days.

(21) Appl. No.: 09/609,825

(22) Filed: Jul. 3, 2000

Related U.S. Application Data

(60) Provisional application No. 60/144,032, filed on Jul. 16, 1999.

(51) Int. Cl.[7] ............................. B60S 1/06; B60S 1/18
(52) U.S. Cl. ............................. 15/250.19; 15/250.21; 15/250.3
(58) Field of Search ................. 15/250.19, 250.001, 15/250.202, 250.203, 250.21, 250.3, 250.31

(56) References Cited

U.S. PATENT DOCUMENTS

| | | | | |
|---|---|---|---|---|
| 2,306,980 A | * | 12/1942 | Roberts | 15/250.19 |
| 2,337,879 A | * | 12/1943 | Folberth et al. | 15/250.19 |
| 2,624,904 A | * | 1/1953 | Wianco | 15/250.23 |
| 2,717,408 A | * | 9/1955 | Le Page | 15/250.19 |
| 2,784,438 A | * | 3/1957 | Petersen | 15/250.19 |
| 5,487,204 A | * | 1/1996 | Nelson | 15/250.19 |
| 5,551,116 A | * | 9/1996 | DeKelaita | 15/250.19 |
| 5,636,407 A | * | 6/1997 | Len | 15/250.19 |
| 5,749,119 A | * | 5/1998 | Isaac | 15/250.19 |
| 5,867,858 A | * | 2/1999 | Kelly | 15/250.19 |
| 5,890,256 A | * | 4/1999 | Eustache | 15/250.21 |

FOREIGN PATENT DOCUMENTS

| | | | | |
|---|---|---|---|---|
| DE | 882809 | * | 7/1953 | 15/250.19 |
| JP | 4-85150 | * | 3/1992 | 15/250.19 |

* cited by examiner

Primary Examiner—Gary K. Graham

(57) ABSTRACT

A windshield wiper system that includes a feature which will eliminate the build-up of snow and ice on windshield wiper blades. This feature is an operator initiated activation of a mechanism that produces a slapping action of the wiper blades against the windshield causing the snow and ice build-up to dislodge and fall away. The slapping device is activated by the operator pushing a tab or push button. The slapping motion is accomplished by pivoting the oscillating wiper arm shaft mount, while in the vertical position, by a linkage connected to the wiper arm shaft mount. A solenoid pulsed from a pulse generator moves the linkage which in turn lifts the blade and slaps it back against the windshield.

2 Claims, 4 Drawing Sheets

SLAPPING WINDSHIELD WIPER FOR DE-ICING

CROSS REFERENCE TO RELATED APPLICATION

This application claims benefit of U.S. Provisional Application No. 60/144,032, filing date Jul. 16, 1999.

BACKGROUND OF THE INVENTION

An inherent problem that exists on motor vehicles during winter driving is the build up of ice and slush on the windshield wipers which eventually inhibits the wipers from keeping the windshield clear for adequate visibility.

The cause of this problem is the inability of the defrosting system inside the vehicle to transmit sufficient heat through the glass to melt the snow and ice so that it can flow away by the air blowing over the surface of the windshield.

When sufficient snow and ice has accumulated to cause severe visibility impairment, the most common solution is to stop the vehicle and physically snap the wipers against the windshield to loosen and break away the snow and ice build up. Not only is this task cumbersome and inconvenient for the driver, it is obviously dangerous by nature in that the motor vehicle is stopped on the side of the road in inclement weather with poor visibility.

SUMMARY OF THE INVENTION

A solution to the above problem is for the driver of the motor vehicle to have the ability to activate a system whereby the wipers are lifted away from the windshield and snapped back, thus simulating the action of manually snapping the wipers.

The following invention describes just such a system whereby the operator of the vehicle has, at his disposal, a push button or tab similar to a windshield washer activation button. This button or tab will activate a solenoid which will lift the wipers from the windshield and release them to snap back, causing a slapping action of the wiper blades against the windshield.

DETAILED DESCRIPTION OF THE INVENTION

Figure 1:
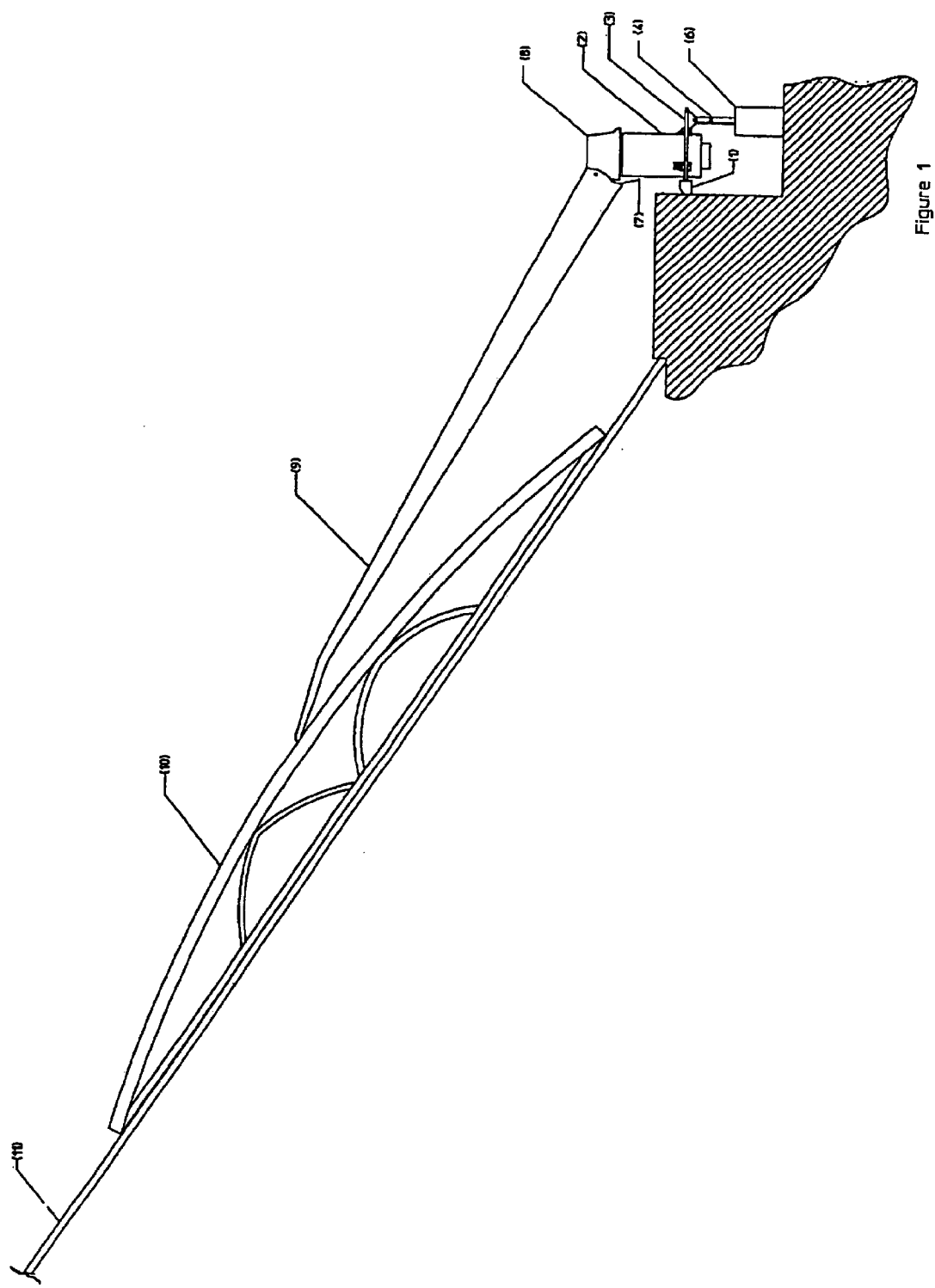
FIG. 1 of the drawings is a side view of a typical windshield wiper system showing the oscillating wiper arm shaft mount, the wiper arm base, the wiper arm and the wiper blade assembly. It also shows the mechanism of this invention whereby the wiper arm shaft mount is pivoted by the action of a solenoid and a lever arm attached to the wiper arm shaft mount. Each of the components in the drawing are identified by reference numbers and are described in the detailed description of the invention.
Figure 2:
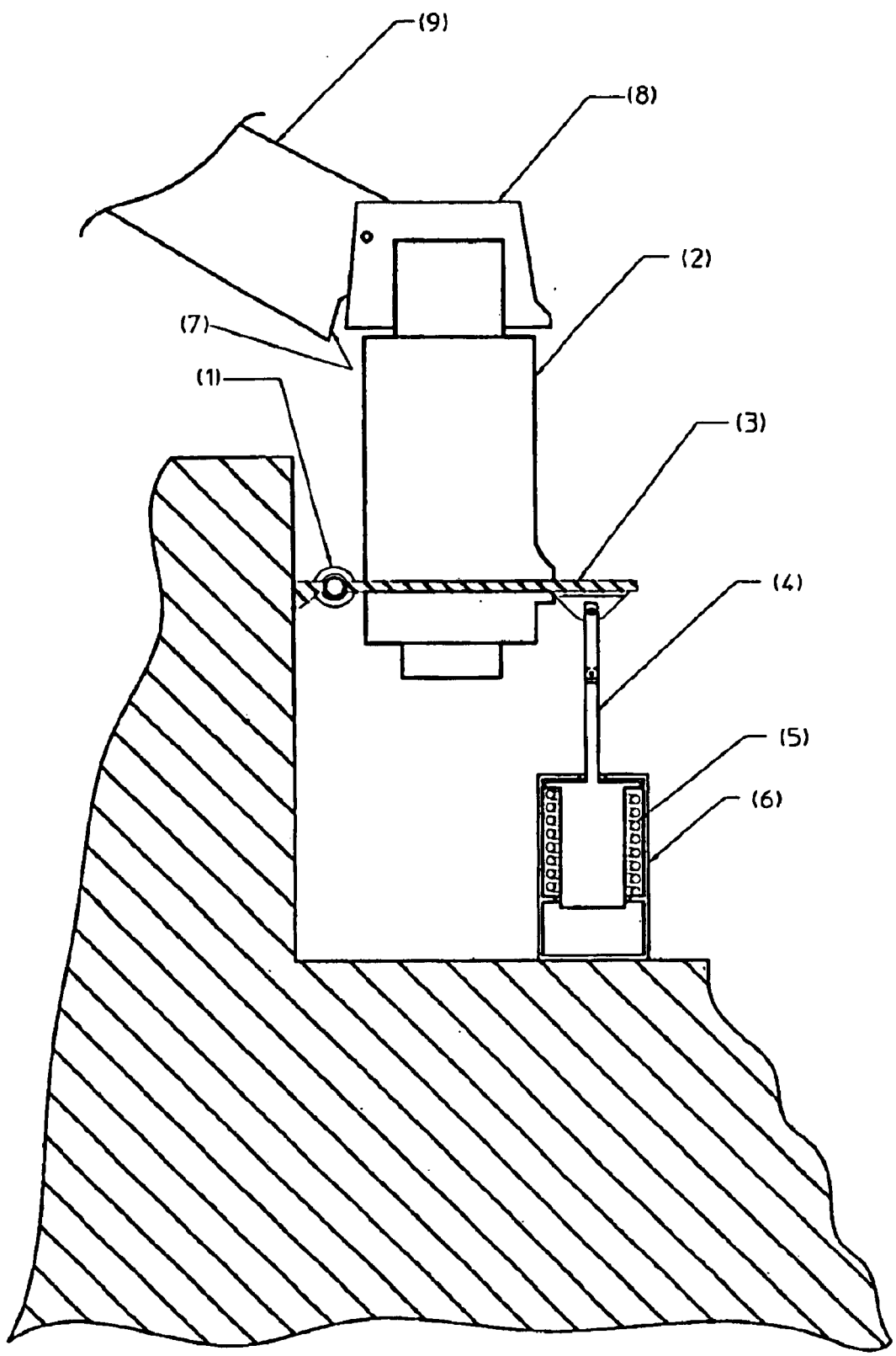
FIG. 2 is a close up of the mechanism of the invention showing each component in greater detail.
Figure 3:
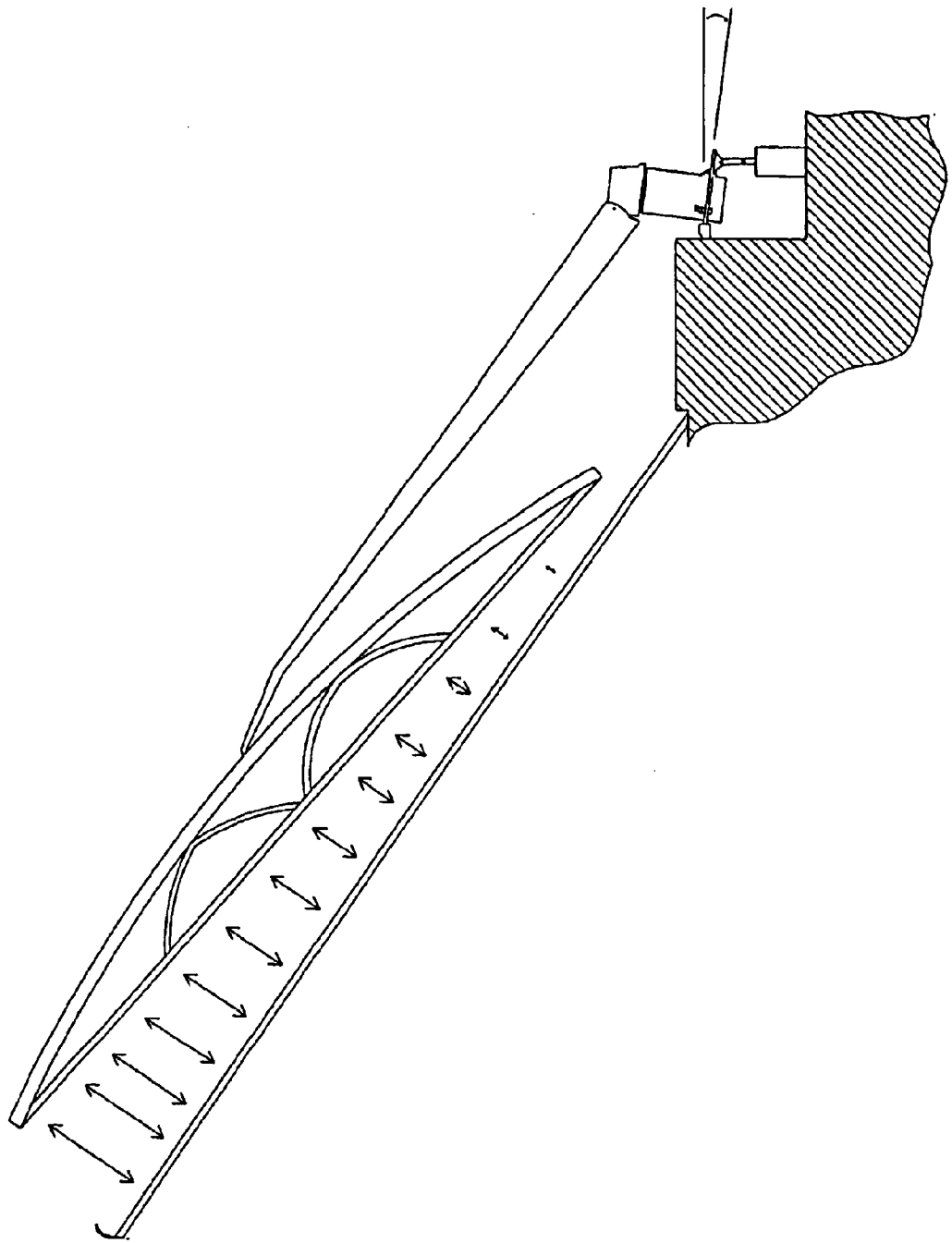
FIG. 3 is a side view of a typical windshield wiper system showing the action of the mechanism.
Figure 4:
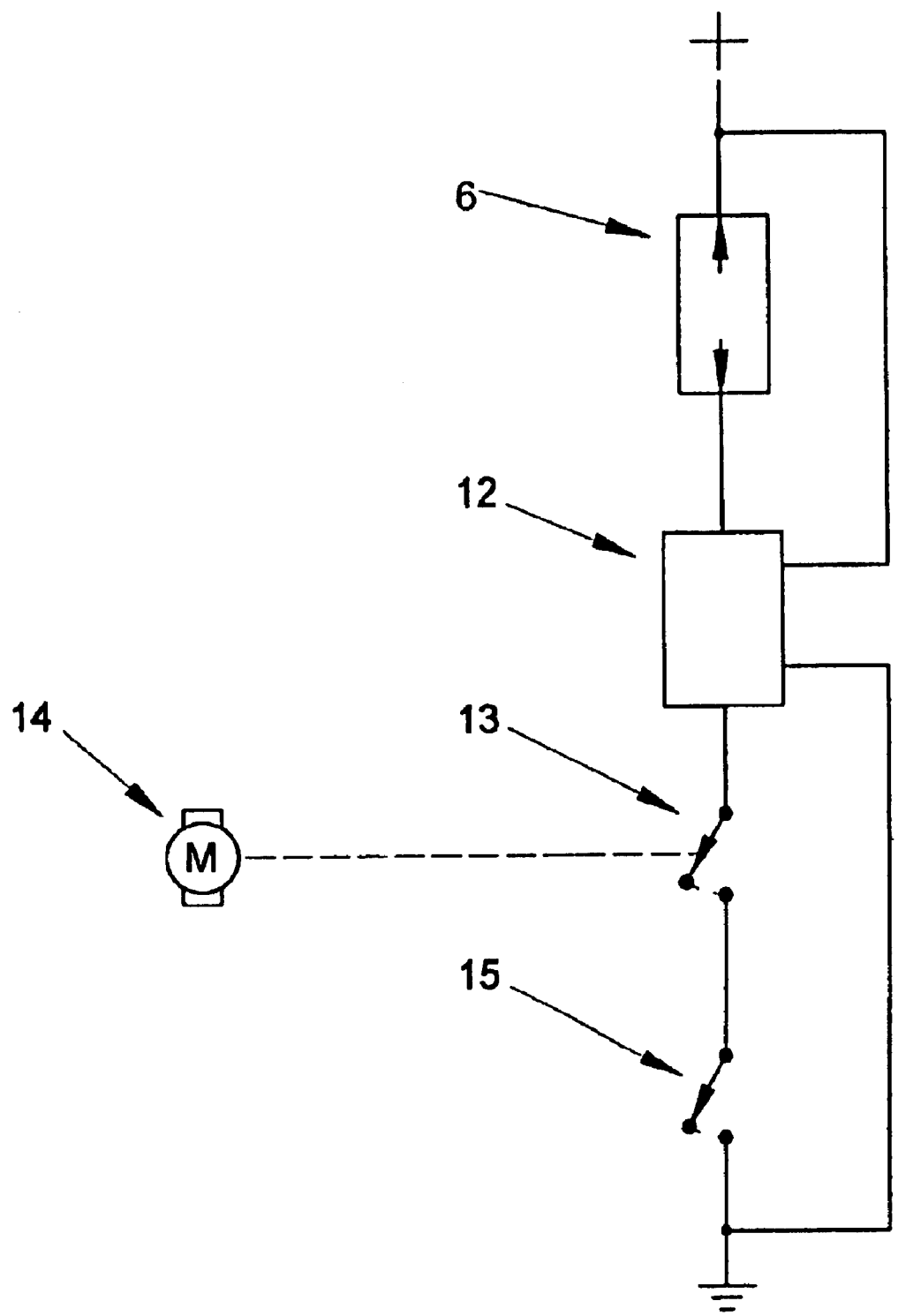
FIG. 4 is the electrical circuit for the solenoid, the pulse generator, the drive mechanism contact switch and the push button contact switch for activation of the circuit.

The slapping wiper is a windshield wiper system designed to lift the windshield wiper blade(s) from the windshield and slap them back against the windshield. The invention consists of:

A pivot (1) on the oscillating wiper arm shaft mount (2) and secured to the vehicle body allowing the shaft mount (2) to move about the pivot (1) parallel to the windshield (11).

A lever (3) attached to the shaft mount (2) to move the shaft mount (2).

A spring (5) attached to the lever via linkage (4) providing pressure to the shaft mount which will in turn transmit pressure to the wiper arm (9) which will keep the wiper blade (10) against the windshield (11).

A solenoid (6) to overcome spring pressure and move the lever (3), thus moving the shaft mount about the pivot in a rocking motion.

A restraint (7) built into the wiper arm base (8) to limit the amount of swing of the wiper arm (9) on its built-in pivot about the base (8) so that the wiper arm (9) will lift the wiper blade assembly (10) from the windshield (11).

A pulse generator (12) in an electrical circuit to provide a pulse to the solenoid (6).

A contact switch (13) on the rotating gear of the wiper drive mechanism (14) to provide electrical circuit closure to the pulse generator when the wiper arm is in the vertical position.

A push contact switch (13) available to the vehicle operator to provide electrical power to the circuit.

I claim:

1. A slapping windshield wiper assembly for a motor vehicle, said windshield wiper assembly comprising:
   an elongated windshield wiper arm assembly including a wiper arm pivotally supported at one end on a base, said base includes a restraint to limit pivotal movement of the arm about said base,
   a wiper blade coupled to a free end of said wiper arm and adapted to contact a surface of a windshield of said motor vehicle,
   a wiper arm shaft mount which includes a pivot for pivotably supporting said mount on said vehicle,
   a wiper arm shaft oscillatably supported in said wiper arm shaft mount and coupled to said base,
   a lever attached to said wiper arm shaft mount,
   a spring providing force on said lever to bias said shaft mount about said shaft mount pivot to maintain pressure on the wiper arm assembly and keep the wiper blade against the windshield surface,
   a solenoid coupled to said lever, said solenoid adapted, upon actuation, to counteract said spring force and move said lever to thus rock said shaft mount about said shaft mount pivot, such acts to lift the wiper blade away from the windshield surface.

2. The slapping windshield wiper assembly as set forth in claim 1, further comprising:
   an electric circuit to control said solenoid, said circuit includes,
   a pulse generator to provide an electrical pulse to said solenoid,
   a contact switch on a wiper drive mechanism to provide circuit closure to said pulse generator when said wiper arm assembly is in a vertical position,
   a push contact switch to provide electrical power to said electrical circuit.

* * * * *

UNITED STATES PATENT AND TRADEMARK OFFICE
CERTIFICATE OF CORRECTION

PATENT NO.   : 6,721,989 B1
DATED        : April 20, 2004
INVENTOR(S)  : Robert N. Barlow It is certified that error appears in the above-identified patent and that said Letters Patent is hereby corrected as shown below:

Column 2,
Line 26, should read -- A push contact switch (15) available……. --.

Signed and Sealed this

Third Day of August, 2004

JON W. DUDAS
*Acting Director of the United States Patent and Trademark Office*